Figure 1:
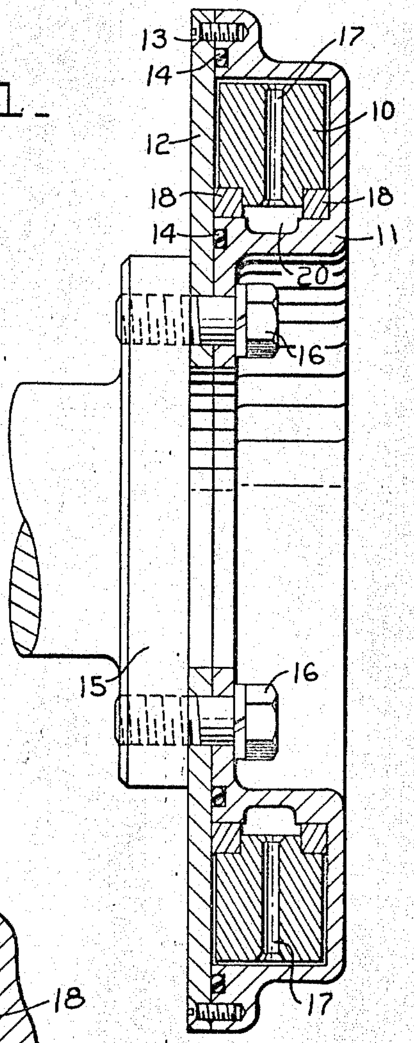

Feb. 15, 1966 S. O. WILLIAMSON 3,234,817

TUNED TORSIONAL VIBRATION DAMPER

Filed May 9, 1961

INVENTOR.
SHELLIE O. WILLIAMSON
BY
Fryer and Tjensvold
ATTORNEYS

United States Patent Office 3,234,817
Patented Feb. 15, 1966

3,234,817

TUNED TORSIONAL VIBRATION DAMPER

Shellie O. Williamson, Peoria, Ill., assignor to Caterpillar Tractor Co., Peoria, Ill., a corporation of California

Filed May 9, 1961, Ser. No. 108,807
5 Claims. (Cl. 74—574)

This application relates to torsional vibration dampers of the kind for example used for damping the torsional vibration of an internal combustion engine.

A presently and commonly used damper is that known as a viscous vibration damper. It comprises an annular inertia weight disposed for relative rotation within an annular housing which is fixed to an engine crankshaft for rotation therewith. The space, usually a few thousandths of an inch, between the weight and housing is filled with a viscous fluid of which silicone is a prominent example, and the resistance to shear of the film of viscous fluid between the surfaces of the weight and housing produces a damping effect in the manner of what is sometimes referred as a lineal dashpot. In some cases, bearings have been provided to support the weight relative to the housing to maintain concentricity of the relatively moving parts and prevent destructive contact of one with the other and consequent breaking down and solidification of the viscous component.

Dampers of the kind so far described have functioned successfully to a point but have been improved by tuning which is accomplished by the addition of some form of spring which resists relative rotation of the weight and housing. Many structures have been devised to accomplish such tuning. Some including rubber or other elastomers and some utilizing metal springs connecting the relatively rotating parts. These devices are complex and costly and subject to early failure. Tuned dampers are desirable because they broaden the speed range through which damping is effective and they achieve greater reduction of torsional vibration amplitude than untuned dampers of comparable size.

It is the object of the present invention to provide a tuned torsional vibration damper of the same general type as those hereinabove described at a relatively low cost and of few simple components and also to provide a viscous type damper in which the clearance providing space for its viscous component is greater than that in known viscous dampers, thus reducing the possibility of contact between its solid relatively rotating elements.

Further and more specific objects and advantages of the invention are made apparent in the following specification wherein the invention is described in detail by reference to the accompanying drawing.

Figure 2:
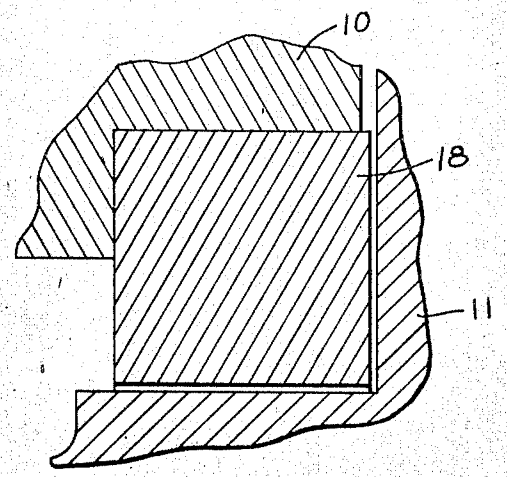

In the drawing:

FIG. 1 is a central sectional view through a damper embodying the present invention; and FIG. 2 is a fragmentary section of one of the bearing bushings shown in FIG. 1 greatly enlarged to illustrate bearing clearances.

In the drawing, an inertia weight of annular configuration is shown at 10 as disposed in an annular housing 11 sealed by a cover 12 held in place by cap screws 13 and having conventional sealing gaskets 14. The entire assembly is secured to the end flange 15 of an engine crankshaft as by cap screws 16. The annular inertia weight 10 is preferably provided with a plurality of radial passages 17 and is guided within the housing 11 to prevent direct contact between the weight and the housing by pilot bearings or bushings 18 which are also of annular configuration and disposed between inner edges of the weight and the inner corners of the housing in a manner to provide clearance between the weight and the housing on all sides. A space considerably larger than this clearance exists between the bushings 18 and in the present case is shown as enlarged by an annular recess in the housing to provide a reservoir 20 for viscous fluid which, under centrifugal action, will pass outwardly through the radial passages 17 and completely fill the clearance adjacent the outer periphery and both sides of the flyweight.

The invention so far described is conventional and the several components may be varied considerably in size and configuration. In some cases, for example, the cover of the housing is permanently secured in place as by rolled or crimped edges rather than by screws and gaskets. The damper of the present invention differs principally from known or conventional dampers in the clearance which is maintained between the inertia weight and the housing and in the viscosity of the fluid which occupies the space provided by this clearance. In conventional dampers, the fluid employed has a viscosity in the approximate order of 60,000 centistokes and the clearance between the external surfaces of the inertia weight and the internal surfaces of the housing is from .006 to .009 of an inch. According to the present invention, the fluid employed is of a consistency of approximately 1,000,000 centistokes and the clearance between the inertia weight and the housing is maintained at from .020 to .030 of an inch. Thus the fluid employed, a preferred example of which is silicone, is of a stiff putty-like consistency rather than the consistency ordinarily considered as being fluid as is the previously used silicone of 60,000 centistokes. This less fluid or stiffer material, in addition to high resistance to shear which is characteristic of silicone, also has an elasticity which augments the function of previously used fluids by producing a tuning as well as a damping action. The greatly enlarged clearance between the inertia weight and the housing which is made possible and desirable by the more viscous substance employed reduces manufacturing cost of the damper because of increased tolerances and also reduces the possibility of damage and eventual destruction of the damper often caused by small dents in the housing which cause frictional engagement with the weight and consequent scuffing which produces heat and eventual destruction of the fluid.

The pilot bushings 18 have been successfully made of non-metallic materials such as nylon and also metal alloys such as bronze. In some instances floating bushings are employed with running clearance between the bushing and the inertia weight as well as between the bushing and the inner surfaces of the housing. Bronze bushings have also been employed as illustrated in FIG. 2 of the drawing wherein the bushing is tightly fitted to the weight 10 and clearance provided between the bushing the bushing and the housing. The clearance here shown is in the order of .007 to .009 of an inch which is considerably greater than conventional bearing clearances for the purpose of enabling the highly viscous fluid to enter the clearance and prevent actual metal to metal contact between the bushing and the housing. In other words this enables the fluid to act in the manner of lubricant although whether it is properly termed as lubricant is questionable because of the fact that it does not provide the load carrying capacity provided by oils and other common lubricants. As is apparent in FIG. 2, the clearance between two sides of the pilot bushing and the housing is considerably smaller than the clearance between the weight and the housing so that even in the event of actual contact of the bushing with the housing at any point working clearance is maintained for the viscous fluid between the housing and the weight.

Operation of vibration dampers constructed in accordance with the present invention has proven far superior to ordinary viscous torsional vibration dampers and when installed on engines they have proven to introduce an additional mode of vibration justifying the conclusion that they are in fact acting as tuned and damped vibration absorbers which have heretofore otherwise been obtainable only through more costly and complex designs.

I claim:

1. A torsional vibration damper having an annular inertia weight in an annular housing free for relative movement therein and spaced from the housing, and a silicone fluid disposed in the space between the weight and housing of sufficiently high viscosity to act as a resilient tuning medium as well as a viscous damping medium.

2. A torsional vibration damper having an annular inertia weight in an annular housing free for relative movement therein and spaced from the housing, and a fluid disposed in the space between the weight and housing having a viscosity in the order of 1,000,000 centistokes.

3. A torsional vibration damper having an annular inertia weight in an annular housing free for relative movement therein and spaced from the housing, and a fluid disposed in the space between the weight and housing having a viscosity in the order of 1,000,000 centistokes, the space between the weight and the housing being at least .020 of an inch.

4. A torsional vibration damper having an annular inertia weight in an annular housing free for relative movement therein and spaced from the housing, and a fluid disposed in the space between the weight and housing having a viscosity in the order of 1,000,000 centistokes, the space between the weight and the housing being at least .020 of an inch, the weight and housing being formed to provide a larger space for a reservoir of said fluid adjacent the inner annular surface of the weight, and the weight having through radially disposed passages for communication of fluid from the reservoir toward the other surfaces of the weight.

5. A torsional vibration damper having an annular inertia weight in an annular housing free for relative movement therein and spaced from the housing, and a fluid disposed in the space between the weight and housing having a viscosity in the order of 1,000,000 centistokes, the space between the weight and the housing being at least .020 of an inch, the weight and housing being formed to provide a larger space for a reservoir of said fluid adjacent the inner annular surface of the weight, and the weight having through radially disposed passages for communication of fluid from the reservoir toward the other surfaces of the weight and pilot bushings between the weight and housing to prevent contact therebetween and having sufficient bearing clearance to admit said viscous fluid to act as a lubricant.

References Cited by the Examiner

UNITED STATES PATENTS

| | | | |
|---|---|---|---|
| 2,824,467 | 2/1958 | O'Connor ___________ | 74—574 |

FOREIGN PATENTS

| | | |
|---|---|---|
| 85,026 | 5/1957 | Netherlands. |
| 794,301 | 4/1958 | Great Britain. |
| 858,739 | 1/1961 | Great Britain. |
| 1,240,049 | 7/1960 | France. |

MILTON KAUFMAN, *Primary Examiner.*

BROUGHTON G. DURHAM, DON A. WAITE, *Examiners.*